(12) United States Patent
Ueta et al.

(10) Patent No.: US 11,365,646 B2
(45) Date of Patent: Jun. 21, 2022

(54) ROTARY MACHINE AND SEAL MEMBER

(71) Applicant: Mitsubishi Power, Ltd., Yokohama (JP)

(72) Inventors: Yasuhiko Ueta, Kanagawa (JP); Hisataka Fukushima, Kanagawa (JP); Kentaro Tanaka, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 17 days.

(21) Appl. No.: 17/261,965

(22) PCT Filed: Jul. 16, 2019

(86) PCT No.: PCT/JP2019/027905
§ 371 (c)(1),
(2) Date: Jan. 21, 2021

(87) PCT Pub. No.: WO2020/031625
PCT Pub. Date: Feb. 13, 2020

(65) Prior Publication Data
US 2021/0293153 A1 Sep. 23, 2021

(30) Foreign Application Priority Data
Aug. 8, 2018 (JP) .............................. JP2018-149446

(51) Int. Cl.
*F01D 11/08* (2006.01)
*F01D 25/24* (2006.01)
*F01D 25/28* (2006.01)

(52) U.S. Cl.
CPC .............. *F01D 11/08* (2013.01); *F01D 25/24* (2013.01); *F01D 25/28* (2013.01);
(Continued)

(58) Field of Classification Search
CPC ........ F01D 11/02; F01D 11/005; F01D 11/08; F01D 9/02; F01D 25/24; F01D 25/28;
(Continued)

(56) References Cited

U.S. PATENT DOCUMENTS 4,630,994 A * 12/1986 Gross .................... F01D 25/246
415/214.1
4,819,313 A 4/1989 Dadhich
(Continued)

FOREIGN PATENT DOCUMENTS

JP H02-27102 A 1/1990
JP H04-093573 U 8/1992
(Continued)

OTHER PUBLICATIONS

Written Opinion dated Oct. 8, 2019, issued in counterpart Application No. PCT/JP2019/027905, with English Translation. (9 pages).

*Primary Examiner* — Igor Kershteyn
(74) *Attorney, Agent, or Firm* — WHDA, LLP

(57) ABSTRACT

In a rotary machine and a seal member, a casing, a rotor, a stator blade, a rotor blade, and a seal device disposed between the casing and a tip portion of the rotor blade are provided, in which a blade attachment groove is provided in the inner peripheral portion of the casing, and a caulking groove is provided adjacent to the blade attachment groove, in which a base end portion of the stator blade is mounted in the blade attachment groove and a caulking member is locked to the caulking groove and a blade root portion of the stator blade, so that the stator blade is fixed to the inner peripheral portion of the casing, and in which a seal ring as a seal device is mounted in the inner peripheral portion of the casing, and the seal ring covers at least a part of the caulking groove.

10 Claims, 4 Drawing Sheets

(52) U.S. Cl.
CPC ...... *F05D 2220/31* (2013.01); *F05D 2230/23* (2013.01); *F05D 2240/55* (2013.01)

(58) Field of Classification Search
CPC .... F01D 25/246; F16J 15/447; F16J 15/4472; F05D 2220/31; F05D 2230/23; F05D 2240/55
See application file for complete search history.

(56) References Cited

U.S. PATENT DOCUMENTS

| | | | |
|---|---|---|---|
| 5,632,598 A | 5/1997 | Maier | |
| 5,833,244 A * | 11/1998 | Salt | F01D 11/02 |
| | | | 416/198 A |
| 2002/0127101 A1 * | 9/2002 | Bekrenev | F01D 25/12 |
| | | | 415/232 |
| 2018/0016928 A1 | 1/2018 | Kuwamura et al. | |
| 2018/0245474 A1 * | 8/2018 | Alexander | F01D 5/087 |

FOREIGN PATENT DOCUMENTS

| | | |
|---|---|---|
| JP | 2013-194519 A | 9/2013 |
| JP | 2016-138483 A | 8/2016 |
| JP | 2017-160827 A | 9/2017 |

* cited by examiner

ROTARY MACHINE AND SEAL MEMBER

TECHNICAL FIELD

The present invention relates to a rotary machine in which a seal device that suppresses leakage of a fluid between a stationary side and a rotation side is disposed, and to a seal member forming the seal device.

BACKGROUND ART

For example, a steam turbine is configured such that a rotor is rotatably supported by bearings in a casing, a plurality of stages of rotor blades are fixed to the rotor, and a plurality of stages of stator blades are fixed to the casing. Then, steam is supplied from a supply port of the casing to pass through the plurality of rotor blades and stator blades, so that, the rotor is driven via the rotor blades to rotate and the steam is discharged to the outside from a discharge port.

In such a steam turbine, in order to suppress a leakage flow of the steam in an axial direction between the casing and a tip portion of the rotor blade, a seal device is provided between the tip portion of the rotor blade and the casing. A labyrinth seal is generally applied to the seal device. A plurality of seal fins are provided in the tip portion of the rotor blade or an inner surface of the casing to form the labyrinth seal. Since gaps are formed between the plurality of seal fins and the inner surface of the casing or the tip portion of the rotor blade to generate pressure loss, a leakage flow of the steam in the axial direction is suppressed by the pressure loss. Such a seal device is described in, for example, PTL 1.

CITATION LIST

Patent Literature

[PTL 1] Japanese Unexamined Utility Model Registration Application Publication No. 04-093573

SUMMARY OF INVENTION

Technical Problem

In the steam turbine described above, a flow of steam which has leaked from the seal device merges with a main flow of steam which has passed through the rotor blade or the stator blade. The main flow of steam is a flow along the axial direction of the rotor whereas the leakage flow of steam in the tip portion of the rotor blade is a flow that is inclined from an inner peripheral portion of the casing toward a rotor side. In this case, it is important that the leakage flow of steam is controlled to smoothly merge with the main flow of steam to reduce the mixing loss in a merge portion; thereby, deterioration in performance is suppressed.

By the way, a base end portion of the rotor blade, the base end portion being located on an inner side in a radial direction, is fixed to an outer peripheral portion of the rotor, and a base end portion of the stator blade, the base end portion being located on an outer side in the radial direction, is fixed to the inner peripheral portion of the casing. In this case, after the base end portion of the stator blade is fitted into an attachment groove formed in the inner peripheral portion of the casing, a caulking member is pushed into a caulking groove formed between the base end portion of the stator blade and the attachment groove, so that the stator blade is fixed to the casing. The caulking groove is formed upstream of the stator blade in a flow direction of the steam. For this reason, the flow of the steam which has leaked from the seal device is affected by the caulking groove to become a vertical vortex flow along the radial direction, and then to merge with the main flow of the steam at a large inclination angle. Thereupon, when the leakage flow of the steam merges with the main flow of the steam, both flows interfere with each other to increase the mixing loss in a merge portion, thereby resulting in deterioration in performance.

The present invention solves the above-described problem, and an object of the present invention is to provide a rotary machine and a seal member in which a leakage flow of a fluid from a seal device smoothly merges with a main flow of the fluid to reduce the mixing loss in a merge portion, so that the performance is improved.

Solution to Problem

According to the present invention, in order to achieve the above object, there is provided a rotary machine including: a casing having a hollow shape; a rotor that is rotatably supported in the casing; a stator blade fixed to an inner peripheral portion of the casing; a rotor blade that is shifted with respect to the stator blade in an axial direction of the rotor to be fixed to an outer peripheral portion of the rotor; and a seal device disposed between the inner peripheral portion of the casing and a tip portion of the rotor blade. An attachment recessed portion is provided in the inner peripheral portion of the casing, and a caulking recessed portion is provided adjacent to the attachment recessed portion. A base end portion of the stator blade is mounted in the attachment recessed portion, and a caulking member is locked to the caulking recessed portion and the base end portion of the stator blade, so that the stator blade is fixed to the inner peripheral portion of the casing. The seal device includes a seal member mounted in the inner peripheral portion of the casing, and the seal member covers at least a part of the caulking recessed portion.

Therefore, when the fluid is supplied into the casing, a main flow of the fluid passes through the stator blade and the rotor blade to cause the rotor blade to rotate, and a part of the fluid flows between the casing and the tip portion of the rotor blade, so that the seal device functions to suppress leakage of the fluid. At this time, a part of the fluid which has leaked from the seal device merges with the main flow of the fluid which has passed through the stator blade and the rotor blade. Here, since the caulking recessed portion provided in the inner peripheral portion of the casing is covered with the seal member, the fluid which has leaked from the seal device is not affected by the caulking recessed portion, so that the leaking fluid smoothly merges with the main flow of the fluid without forming a vertical vortex flow. As a result, the fluid which has leaked from the seal device smoothly merges with the main flow of the fluid, so that the mixing loss in a merge portion is reduced; thereby, the performance can be improved.

In the rotary machine of the present invention, the caulking recessed portion is provided upstream of the attachment recessed portion in a flow direction of a fluid, and an end portion of the seal member, the end portion being located on a downstream side in the flow direction of the fluid, covers the caulking recessed portion.

Therefore, since the end portion of the seal member covers the caulking recessed portion, the caulking recessed portion can be properly covered with a simple structure.

In the rotary machine of the present invention, a predetermined gap is provided between an end portion of the seal member, the end portion being located in a flow direction of a fluid, and the stator blade.

Therefore, since the predetermined gap is provided between the end portion of the seal member and the stator blade, interference of the seal member with peripheral members caused by thermal expansion is suppressed; thereby, deformation of the seal member can be suppressed.

In the rotary machine of the present invention, a flat surface along the axial direction of the rotor is provided by the seal member between a plurality of stages of the stator blades.

Therefore, since the flat surface is provided by the seal member, the fluid leaking from the seal device smoothly flows due to the flat surface; thereby, the leakage flow of the fluid can smoothly merge with the main flow of the fluid.

In the rotary machine of the present invention, the flat surface of the seal member is continuous with an inner peripheral surface of the casing without a step between the flat surface and the inner peripheral surface.

Therefore, since the flat surface of the seal member is continuous with the inner peripheral surface of the casing without a step therebetween, the fluid entering the seal device or the fluid leaking from the seal device smoothly flows due to the flat surface and the inner peripheral surface; thereby, the leakage flow of the fluid can smoothly merge with the main flow of the fluid.

In addition, there is provided a seal member that is disposed between an inner peripheral portion of a casing and a tip portion of a rotor blade, the member including: an attachment portion mounted in the inner peripheral portion of the casing; a seal portion provided inside the attachment portion in a radial direction; and a plurality of fins that are provided at predetermined intervals in a flow direction of a fluid so as to protrude inward from the seal portion in the radial direction. When a distance between an upstreammost fin and a downstreammost fin of the plurality of fins is D1, and a distance between the downstreammost fin and a downstream end of the seal portion is D2, D1×0.5>D2.

Therefore, the fluid which has leaked from the seal member smoothly merges with a main flow of the fluid, so that the mixing loss in a merge portion is reduced; thereby, the performance can be improved.

In the seal member of the present invention, when a distance between an upstream end of the seal portion and the upstreammost fin is D3, D3>D2.

In the seal member of the present invention, the seal portion includes a protrusion portion that extends further downstream than a downstream end of the rotor blade in an assembly state where the seal portion is assembled to the inner peripheral portion of the casing.

In the seal member of the present invention, a cavity is provided outside the protrusion portion in the radial direction in the assembly state.

In the seal member of the present invention, the plurality of fins are provided only upstream of the protrusion portion in the seal portion.

Advantageous Effects of Invention

According to the rotary machine and the seal member of the present invention, since the leakage flow of the fluid from the seal device smoothly merges with the main flow of the fluid, the mixing loss in a merge portion is reduced; thereby, the performance can be improved.

DESCRIPTION OF EMBODIMENTS

An exemplary embodiment of a rotary machine according to the present invention will be described in detail below with reference to the accompanying drawings. Incidentally, the present invention is not limited by the embodiment, and in the case of a plurality of embodiments, the present invention also includes a combination of the embodiments.

Figure 3:
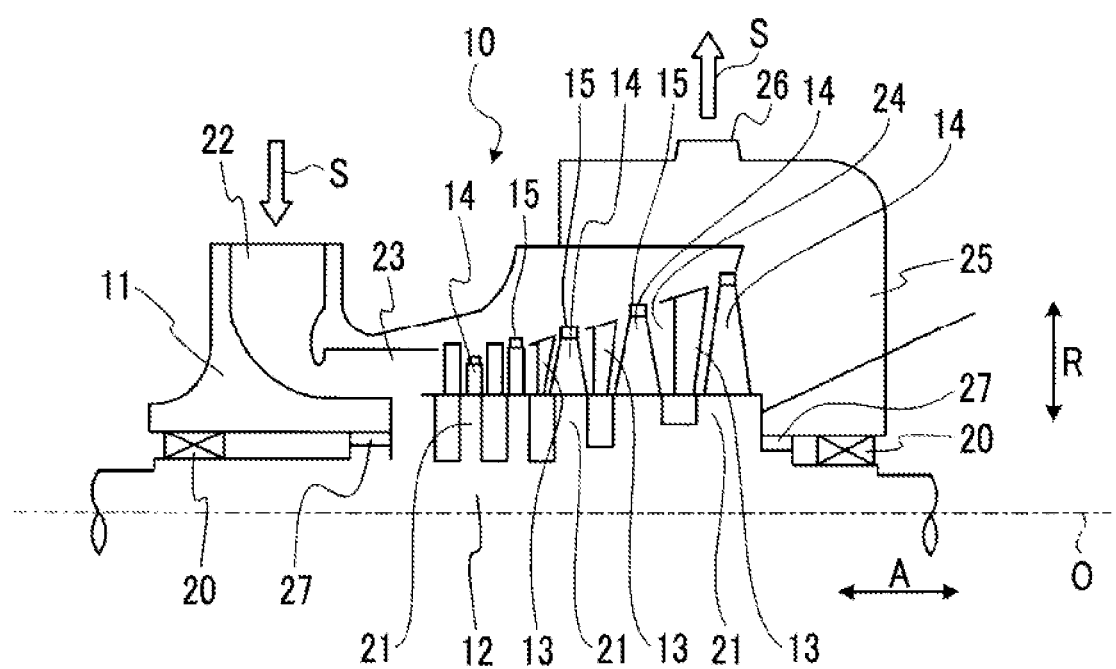
FIG. 3 is a schematic view illustrating the steam turbine of the present embodiment.

FIG. 3 is a schematic view illustrating a steam turbine of the present embodiment.

In the present embodiment, a steam turbine will be described as an example of the rotary machine of the present invention. As illustrated in FIG. 3, a steam turbine 10 includes a casing 11, a rotor 12, a stator blade 13, a rotor blade 14, and a seal device 15.

The casing 11 has a hollow shape, and the rotor 12 is disposed along a horizontal direction inside the casing 11. The rotor 12 is supported by bearings 20, which are provided in the casing 11, so as to be rotatable around an axis O. A plurality of the stator blades 13 are fixed to an inner peripheral portion of the casing 11 at predetermined intervals in an axial direction A of the rotor 12. A plurality of rotor disks 21 are fixed to an outer peripheral portion of the rotor 12 at predetermined intervals in the axial direction A, and a plurality of the rotor blades 14 are fixed to an outer peripheral portion of each of the rotor disks 21. The stator blades 13 and the rotor blades 14 are disposed along a radial direction R of the rotor 12 and at predetermined intervals in a circumferential direction of the rotor 12, and are alternately disposed along the axial direction A of the rotor 12.

A steam supply port 22 is provided on one end portion side in the axial direction A of the casing 11, and the steam supply port 22 communicates via a steam passage 23 with a blade row portion 24 in which the stator blades 13 and the rotor blades 14 are disposed. The blade row portion 24 communicates with a steam discharge port 26 through an exhaust chamber 25.

In addition, a seal member 27 is provided between each end portion in the axial direction A of the rotor 12 and the casing 11. Each of the seal members 27 is disposed inside the bearing 20, namely, on a stator blade 13 and rotor blade 14 side. Furthermore, the seal device 15 is provided between a tip portion of the rotor blade 14, the tip portion being located on an outer side in the radial direction R, and the inner peripheral portion of the casing 11.

For this reason, when steam S is supplied from the steam supply port 22 to the blade row portion 24 through the steam passage 23, the steam S passes through the plurality of stator blades 13 and the plurality of rotor blades 14, so that the rotor 12 is driven via the rotor blades 14 to rotate to drive a generator (not illustrated) connected to the rotor 12. There-after, the steam S which has driven the rotor blades 14 is discharged from the steam discharge port 26 through the exhaust chamber 25.

Here, a relationship between the casing 11, the stator blade 13, the rotor blade 14, and the seal device 15 in the steam turbine 10 described above will be described in detail FIG. 1 is a cross-sectional view illustrating a mounting portion of the seal device in the steam turbine as the rotary machine of the present embodiment.

Figure 1:
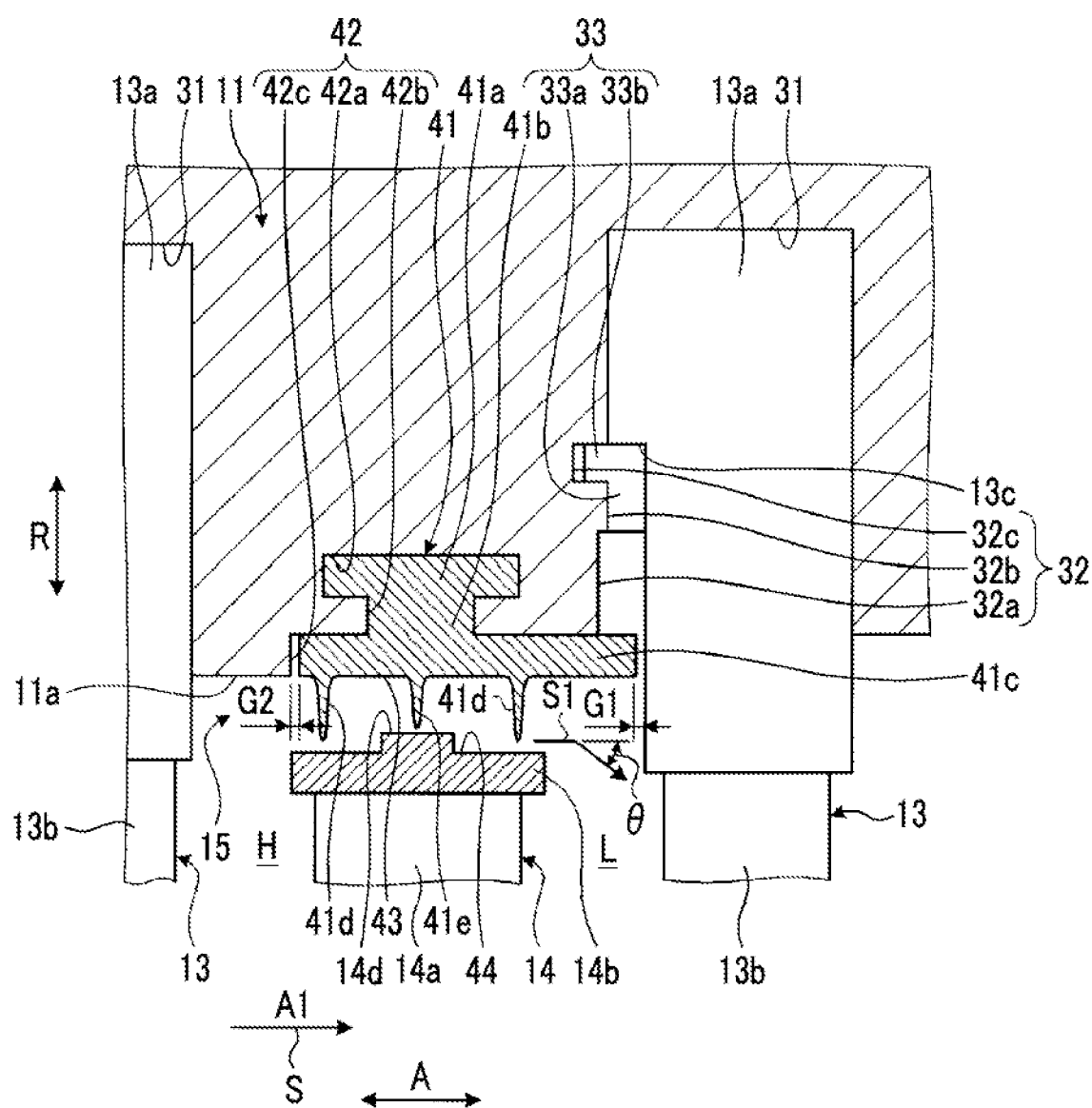
FIG. 1 is a cross-sectional view illustrating a mounting portion of a seal device in a steam turbine as a rotary machine of the present embodiment.

As illustrated in FIG. 1, the seal device 15 is provided between the casing 11 and the tip portion of the rotor blade 14. The seal device 15 suppresses leakage of the flow of the steam (fluid) S flowing between the casing 11 and the tip portion of the rotor blade 14 from a high pressure side H to a low pressure side L along the axial direction A of the rotor 12. Here, the steam S flows from the high pressure side H to the low pressure side L along a steam flow direction A1 along the axial direction A. At this time, a main flow of the steam S flows to pass through the stator blade 13 and the rotor blade 14, and a part of the steam S flows to the seal device 15 between the casing 11 and the tip portion of the rotor blade 14, so that leakage steam S1 leaking from the seal device 15 is generated.

A base end portion of the stator blade 13, the base end portion being located on an outer side in the radial direction R, is fixed to the inner peripheral portion of the casing 11, and a base end portion of the rotor blade 14, the base end portion being located on an inner side in the radial direction R, is fixed to the outer peripheral portion of the rotor 12. Namely, a blade attachment groove 31 as an attachment recessed portion is continuously provided in the inner peripheral portion of the casing 11 along the radial direction R and along the circumferential direction. In addition, a caulking groove 32 as a caulking recessed portion is provided in the inner peripheral portion of the casing 11 along the radial direction R and along the circumferential direction. The caulking groove 32 is provided to communicate with the blade attachment groove 31 at a position that is upstream of the blade attachment groove 31 in the steam flow direction A1 and is adjacent to the blade attachment groove 31.

The blade attachment groove 31 is formed to have a predetermined depth from an inner peripheral surface 11*a* of the casing 11 in the radial direct ion R. The caulking groove 32 is formed to have a predetermined depth shallower than that of the blade attachment groove 31 from the inner peripheral surface 11*a* of the casing 11 in the radial direction R. The caulking groove 32 has a first groove 32*a* that is open to the inner peripheral surface 11*a* of the casing 11, a second groove 32*b* that is continuous with the first groove 32*a*, and a locking groove 32*c* that is continuous with the second groove 32*b*. The length in the axial direction A of the second groove 32*b* is shorter than the length in the axial direction A of the first groove 32*a*, and the locking groove 32*c* is bent at a right angle from the second groove 32*b* to an upstream side in the steam flow direction A1.

The stator blade 13 includes a blade root portion 13*a* as the base end portion located on the outer side in the radial direction R, and a stator blade main body 13*b* extending inward from the blade root portion 13*a* in the radial direction R. In addition, a locking step portion 13*c* is formed in the blade root portion 13*a* of the stator blade 13. A caulking member 33 fixes the stator blade 13 to the blade attachment groove 31. The caulking member 33 includes an insertion portion 33*a* that can be inserted into the caulking groove 32 and has a length shorter than those of the first groove 32*a* and the second groove 32*b* of the caulking groove 32 in the axial direction A, and a locking portion 33*b* that is bent at a right angle from the insertion portion 33*a* to the upstream side in the steam flow direction A1.

For this reason, the blade root portion 13*a* of the stator blade 13 is inserted into the blade attachment groove 31 of the casing 11, and the caulking member 33 is inserted into the caulking groove 32. At this time, a tip portion of the caulking member 33 is locked to the locking step portion 13*c* in the blade root portion 13*a* of the stator blade 13, and the locking portion 33*b* is locked to the locking groove 32*c* of the caulking groove 32. Thereupon, the caulking member 33 does not come off since the locking portion 33*b* is locked to the locking groove 32*c* of the caulking groove 32, and the stator blade 13 is fixed to the casing 11 without coming off since the locking step portion 13*c* is locked to the caulking member 33. Incidentally, the caulking member 33 is press-fitted into the caulking groove 32 using a pushing jig (not illustrated), and at this time, the locking portion 33*b* is deformed to be locked to the locking groove 32*c* of the caulking groove 32.

The rotor blade 14 includes a blade root portion (not illustrated) as the base end portion located on the inner side in the radial direction R, a rotor blade main body 14*a* extending outward from the blade root portion in the radial direction R, and a shroud 14*b* as a tip portion of the rotor blade main body 14*a*, the tip portion being located on an outer side in the radial direction R. The blade root portion of the rotor blade 14 is fixed to the outer peripheral portion of the rotor 12 (refer to FIG. 3), and the rotor blade 14 is disposed between the stator blades 13 that are disposed at predetermined intervals in the axial direction A.

The seal device 15 includes a seal ring 41 as a seal member mounted in the inner peripheral portion of the casing 11, and is formed of the seal ring 41 and the shroud 14*b* of the rotor blade 14. A seal attachment groove 42 having a T shape is formed in the inner peripheral portion of the casing 11. The seal attachment groove 42 has a first groove 42*a* along the axial direction A, a second groove 42*b* through which the first groove 42*a* is open to the inner peripheral surface 11*a* of the casing 11, and a cutout portion 42*c* along the axial direction A. Only one end portion in the axial direction A (downstream portion in the steam flow direction A1) of the cutout portion 42*c* is open to a stator blade 13 side. The seal attachment groove 42 is continuously provided in the circumferential direction of the casing 11.

The seal ring 41 includes an attachment portion 41*a*, a connection portion 41*b*, a seal portion 41*c*, and a plurality (in the present embodiment, three) of fins 41*d* and 41*e*. The attachment portion 41*a* has a shape along the axial direction A, and is connected to the seal portion 41*c* via the connection portion 41*b*. The seal portion 41*c* has a shape along the axial direction A, and each of both end portions of the seal portion 41*c* extends toward the stator blade 13 side. The plurality of fins 41*d* and 41*e* extend from the seal portion 41*c* toward a rotor blade 14 side. The seal ring 41 has a ring shape along the circumferential direction, the attachment portion 41*a* is fitted into the first groove 42*a* of the seal attachment groove 42 provided in the casing 11, the connection portion 41*b* is fitted into the second groove 42*b*, and the seal portion 41*c* is fitted into the cutout portion 42*c*. Three fins 41*d* and 41*e* are provided at predetermined intervals in the axial direction A of the seal portion 41*c*, and extend such that tip portions of the fins 41*d* and 41*e* face the shroud 14*b* of the rotor blade 14. Incidentally, the numbers of the fins 41*d* and 41*e* are not limited to those described above.

A protrusion 14d is provided on an outer peripheral surface of the shroud 14b of the rotor blade 14. The protrusion 14d is provided in the shroud 14b at an intermediate position in the axial direction A. Very small gaps are set between the tip portions of two fins 41d of the seal ring 41 and the shroud 14b of the rotor blade 14. In addition, the length of the fin 41e of the seal ring 41 is shorter than the length of the fin 41d, and a very small gap is set between the tip portion of the fin 41e and the protrusion 14d of the rotor blade 14. In this case, an inner surface of the seal portion 41c of the seal ring 41 is a flat surface 43 along the axial direction A, and an outer surface of the shroud 14b of the rotor blade 14 is a flat surface 44 along the axial direction A. The flat surface 43 of the seal portion 41c of the seal ring 41 is continuous with the inner peripheral surface 11a of the casing 11 without a step therebetween. Incidentally, the protrusion 14d of the shroud 14b may not be provided, and the lengths of the fins 41d and 41e of the seal ring 41 may be the same.

In addition, the seal ring 41 covers at least a part of the caulking groove 32. The seal portions 41c of the seal rings 41 are disposed between the plurality of stator blades 13 so as to be in close contact with the cutout portions 42c of the casing 11, so that an end portion of each of the seal rings 41, the end portion being located on a downstream side in the steam flow direction A1 of the steam S, covers the first groove 32a of the caulking groove 32 from outside.

In this case, only one end portion in the axial direction A of the seal ling 41 faces the blade root portion 13a of the stator blade 13, and a predetermined gap G1 is provided between the one end portion in the axial direction A and the blade root portion 13a of the stator blade 13. In addition, the other end portion of the seal ring 41 faces an end surface of the cutout portion 42c of the casing 11, and a predetermined gap G2 is provided between the other end portion of the seal ring 41 and the end surface of the cutout portion 42c. The sizes of the predetermined gaps G1 and G2 are set in consideration of the ease to assemble the seal ring 41, the amount of thermal expansion of the seal ring 41 or peripheral members, or the like. In addition, when the steam S is supplied into the casing 11, the casing 11, the stator blade 13, and the seal ring 41 are heated to thermally expand. In this case, if the predetermined gaps G1 and G2 are not provided, the seal ring 41 comes into contact with the casing 11, the stator blade 13, or the like to be deformed, thereby resulting in deterioration in sealing performance, which is a problem. Incidentally, the seal ring 41 may cover at least a part of the caulking groove 32, and it is desirable that the dimensions in the axial direction A of the predetermined gaps G1 and G2 are set to 30% or less of the axial dimension of the caulking groove 32. Specifically, for example, it is desirable that the dimensions in the axial direction A of the predetermined gaps G1 and G2 are set in a range of 0 mm to 5 mm or less.

Incidentally, the inner surface of the seal portion 41c of the seal ring 41 is the flat surface 43 along the axial direction A, but is not limited to this shape. For example, the inner surface of the seal portion 41c may have a protrusion shape or a convex shape that protrudes to the rotor blade 14 side, or may have a recess shape or a concave shape that is recessed to a casing 11 side. In addition, the inner surface shape of a portion of the seal portion 41c of the seal ring 41, the portion covering the caulking groove 32, may have a shape that is inclined or curved to the rotor blade 14 (axis O) side.

For this reason, when the steam S is supplied into the casing 11 to cause the rotor blade 14 to rotate, the steam flows from the high pressure side H to the low pressure side L along the steam flow direction A1. At this time, the main flow of the steam S flows to pass through the stator blade 13 and the rotor blade 14, and a part of the steam S flows to the seal device 15 provided between the casing 11 and the tip portion of the rotor blade 14. The seal device 15 suppresses leakage of the steam S; however, a part of the steam S leaks, so that the leakage steam S1 is generated. The leakage steam S1 which has leaked from the seal device 15 is guided by the inner surface (flat surface 43) of the seal portion 41c of the seal ring 41 and a front surface of the blade root portion 13a of the stator blade 13, to flow to a stator blade main body 13b side to merge with the main flow of the steam S. Here, since the caulking groove 32 formed in the inner peripheral portion of the casing 11 is covered with the seal portion 41c of the seal ring 41, the leakage steam S1 is not affected by the caulking groove 32, so that the leakage steam S1 does not form a vertical vortex flow. As a result, a merge angle θ of the leakage steam S1 with respect to the main flow of the steam s is decreased, so that the leakage steam S1 smoothly merges with the main flow of the steam S.

Figure 2:
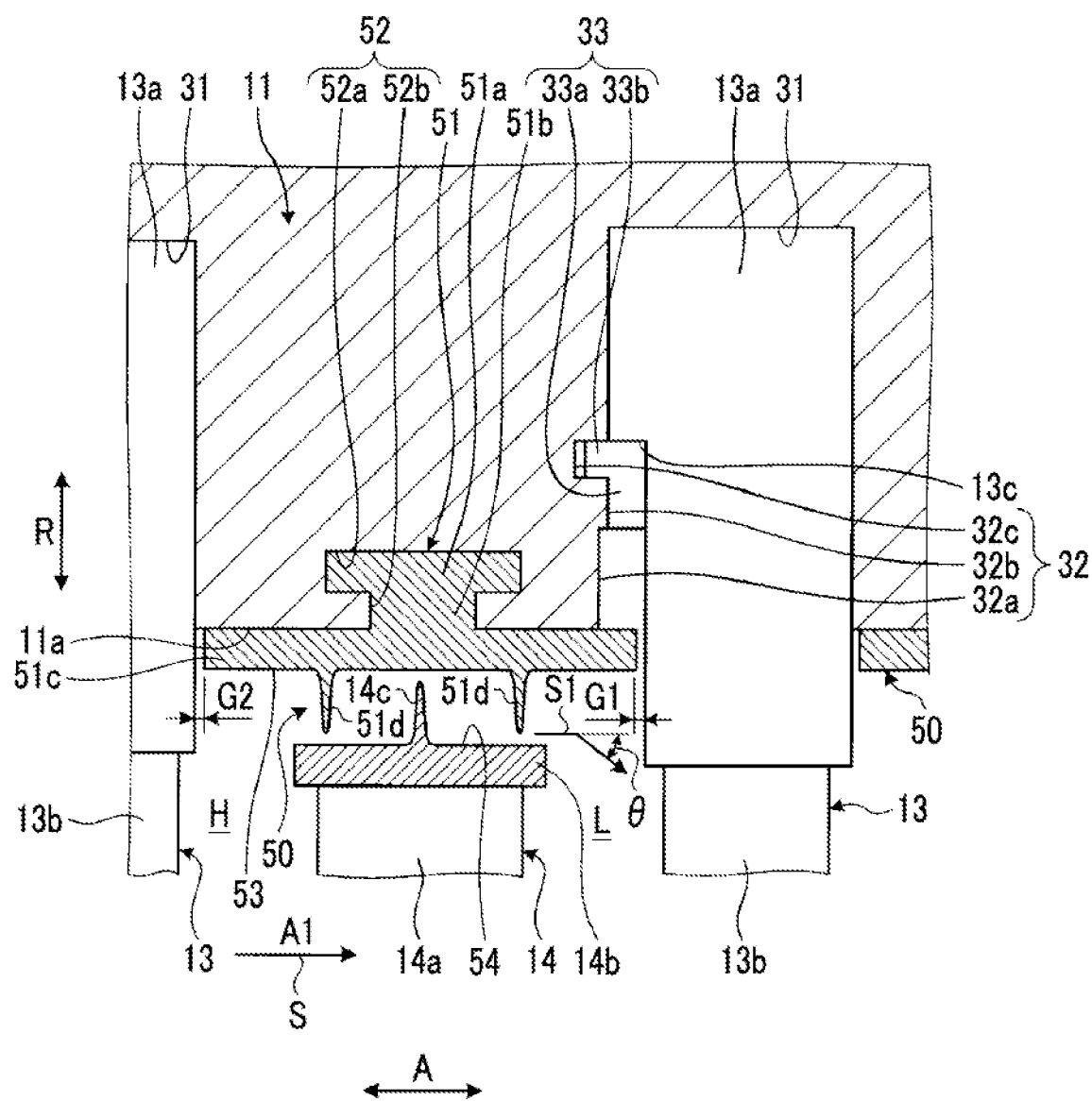
FIG. 2 is a cross-sectional view illustrating a mounting portion of a seal device of a modification example of the steam turbine of the present embodiment.

Incidentally, in the above description, the seal rings 41 are provided in all regions between the plurality of stator blades 13; however, the present invention is not limited to the configuration. FIG. 2 is a cross-sectional view illustrating a mounting portion of a seal device of a modification example in the steam turbine of the present embodiment.

In the modification example of the rotary machine of the present embodiment, as illustrated in FIG. 2, a seal device 50 is provided between the inner peripheral portion of the casing 11 and the tip portion of the rotor blade 14. The blade attachment groove 31 and the caulking groove 32 are provided in the inner peripheral portion of the casing 11. The stator blade 13 includes the blade root portion 13a and the stator blade main body 13b, and the locking step portion 13c is formed in the blade root portion 13a. The caulking member 33 serves to mount the stator blade 13 in the blade attachment groove 31. For this reason, when the blade root portion 13a is inserted into the blade attachment groove 31 of the casing 11, and the caulking member 33 is inserted into the caulking groove 32, the stator blade 13 is fixed to the casing 11.

The rotor blade 14 includes the blade root portion (not illustrated), the rotor blade main body 14a, and the shroud 14b. The seal device 50 includes a seal ring 51 as a seal member mounted in the inner peripheral portion of the casing 11, and is formed of the seal ring 51 and the shroud 14b of the rotor blade 14. A seal attachment groove 52 having a T shape is formed in the inner peripheral portion of the casing 11. The seal attachment groove 52 has a first groove 52a along the axial direction A, and a second groove 52b through which the first groove 52a is open to the inner peripheral surface 11a of the casing 11. The seal attachment groove 52 is continuously provided in the circumferential direction of the casing 11.

The seal ring 51 includes an attachment portion 51a, a connection portion 51b, a seal portion 51c, and a plurality (in the present embodiment, two) of fins 51d. The attachment portion 51a has a shape along the axial direction A, and is connected to the seal portion 51c via the connection portion 51b. The seal portion 51c has a shape along the axial direction A, and each of both end portions of the seal portion 51c extends toward the stator blade 13 side. The plurality of fins 51d extend from the seal portion 51c toward the rotor blade 14 side. The seal ring 51 has a ring shape along the circumferential direction, the attachment portion 51a is fitted into the first groove 52a of the seal attachment groove 52 provided in the casing 11, and the connection portion 51b is fitted into the second groove 52b. The seal portion 51c of the seal ring 51 is disposed on the inner peripheral surface 11a of the casing 11 and between the stator blades 13 that are disposed at predetermined intervals in the axial direction A. Two fins 51d are provided at predetermined intervals in the axial direction A of the seal portion 51c, and extend such that tip portions of the fins 51d face the shroud 14b of the rotor blade 14. The number of the fins 51d is not limited to that described above.

A fin 14c is provided on the outer peripheral surface of the shroud 14b of the rotor blade 14. The fin 14c is provided at an intermediate position between the two fins 51d of the seal ring 51, and a tip portion of the fin 14c extends to face the seal portion 51c. A very small gap is set between the tip portion of each of the fins 51d of the seal ring 51 and the shroud 14b of the rotor blade 14. In addition, a very small gap is set between the fin 14c of the rotor blade 14 and the seal portion 51c of the seal ring 51. In this case, an inner surface of the seal portion 51c of the seal ring 51 is a flat surface 53 along the axial direction A, and the outer surface of the shroud 14b of the rotor blade 14 is a flat surface 54 along the axial direction A. The seal device 50 of the present embodiment is a labyrinth seal, pressure loss of the steam S is generated by the very small gap between each of the fins 51d of the seal ring 51 and the shroud 14b and the very small gap between the fin 14c of the rotor blade 14 and the seal portion 51c, and a leakage flow of the steam S in the axial direction A is suppressed by the pressure loss.

In addition, the seal ring 51 covers at least a part of the caulking groove 32. The seal portions 51c of the seal rings 51 are disposed on the inner peripheral surface 11a of the casing 11 and between the plurality of stator blades 13, so that an end portion of each of the seal rings 51, the end portion being located on a downstream side in the steam flow direction A1 of the steam S, covers the first groove 32a of the caulking groove 32 from outside.

In this case, both the end portions in the axial direction A of the seal ring 51 face the blade root portions 13a of the stator blades 13, and the predetermined gaps G1 and G2 are provided between the end portions of the seal ring 51 and the blade root portions 13a of the stator blades 13. The sizes of the predetermined gaps G1 and G2 are set in consideration of the ease to assemble the seal ring 51, the amount of thermal expansion of the seal ring 51 or peripheral members, or the like.

Incidentally, since the effects of the modification example of the present embodiment are substantially the same as those of the present embodiment, a description thereof will be omitted.

Figure 4:
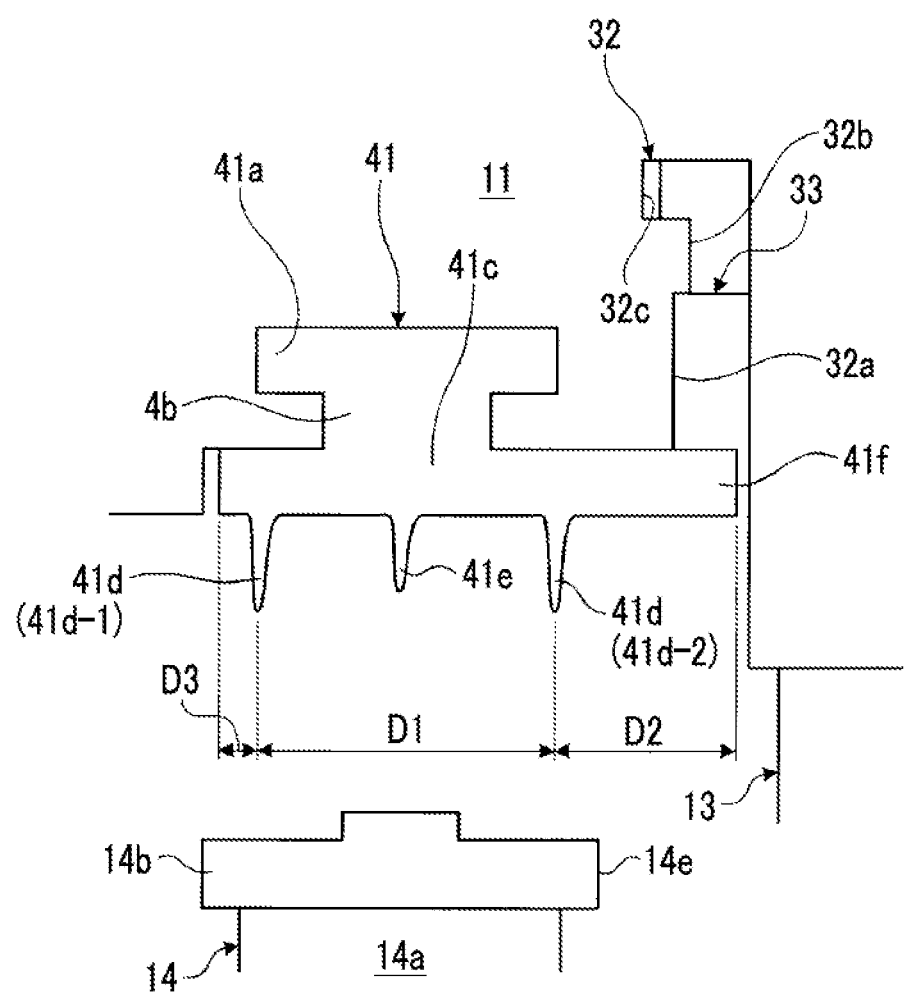
FIG. 4 is a schematic view for describing a configuration of a seal member of the present embodiment.

Here, a specific configuration of the seal ring (seal member) 41 of the present embodiment will be described. FIG. 4 is a schematic view for describing the configuration of the seal member of the present embodiment.

As illustrated in FIG. 4, the seal ring 41 as a seal member is disposed between the inner peripheral portion of the casing 11 and the tip portion of the rotor blade 14. The seal ring 41 includes the attachment portion 41a that is mounted in the inner peripheral portion of the casing 11, the seal portion 41c that is provided inside the attachment portion 41a in the radial direction, and the plurality of fins 41d and 41e that are provided at predetermined intervals in a flow direction of the steam S so as to protrude inward from the seal portion 41c in the radial direction.

In the present embodiment, the three fins 41d and 41e are provided, and include an upstreammost fin 41d-1 provided on an upstream end (left end in FIG. 4) side of the seal portion 41c, a downstreammost fin 41d-2 provided on a downstream end (right end in FIG. 4) side of the seal portion 41c, and a fin 41e between the upstreammost fin 41d-1 and the downstreammost fin 41d-2. Then, when a first distance between the upstreammost fin 41d-1 and the downstreammost fin 41d-2 is D1, and a second distance between the downstreammost fin 41d-2 and a downstream end of the seal portion 41c is D2, D1 and D2 are set to satisfy D1×0.5<D2.

In addition, a third distance between an upstream end of the seal portion 41c and the upstreammost fin 41d-1 is D3, D3 is set to satisfy D3<D2.

Incidentally, D1, D2, and D3 are lengths from the center positions of the upstreammost fin 41d-1 and the downstreammost fin 41d-2 in the flow direction of the steam S.

In addition, the seal portion 41c includes a protrusion portion 41f that extends further downstream than a downstream end 14e of the rotor blade 14 (shroud 14b) in an assembly state where the seal portion 41c of the seal ring 41 is assembled to the inner peripheral portion of the casing 11. The caulking groove 32 as a cavity is provided outside the protrusion portion 41f in the radial direction in the assembly state. The plurality of fins 41d (41d-1 and 41d-2) and 41e are provided only upstream of the protrusion portion 41f in the seal portion 41c.

As described above, the rotary machine of the present embodiment includes the casing 11 having a hollow shape; the rotor 12 that is rotatably supported in the casing 11; the stator blade 13 fixed to the inner peripheral portion of the casing 11; the rotor blade 14 that is shifted with respect to the stator blade 13 in the axial direction A of the rotor 12 to be fixed to the outer peripheral portion of the rotor 12; and the seal device 15 or 50 disposed between the inner peripheral portion of the casing 11 and the tip portion of the rotor blade 14. The blade attachment groove 31 is provided in the inner peripheral portion of the casing 11, and the caulking groove 32 is provided adjacent to the blade attachment groove 31. The base end portion of the stator blade 13 is mounted in the blade attachment groove 31 and the caulking member 33 is locked to the caulking groove 32 and the blade root portion 13a of the stator blade 13, so that the stator blade 13 is fixed to the inner peripheral portion of the casing 11. The seal ring 41 or 51 as the seal device 15 or 50 is mounted in the inner peripheral portion of the casing 11, and at least a part of the caulking groove 32 is covered with the seal ring 41 or 51.

Therefore, when the leakage steam S1 which has leaked from the seal device 15 or 50 merges with the main flow of the steam S which has passed through the stator blade 13 and the rotor blade 14, since the caulking groove 32 is covered with the seal ring 41 or 51, the leakage steam S1 is not affected by the caulking groove 32, so that the leakage steam S1 smoothly merges with the main flow of the steam S without forming a vertical vortex flow. As a result, the leakage steam S1 from the seal device 15 or 50 smoothly merges with the main flow of the steam S, so that the mixing loss in a merge portion is reduced to improve the blade row efficiency; thereby, the performance of the steam turbine 10 can be improved.

In the rotary machine of the present embodiment, the caulking groove 32 is provided upstream of the blade attachment groove 31 in the steam flow direction A1, and the end portion of the seal ring 41 or 51, the end portion being located on the downstream side in the steam flow direction A1, covers the caulking groove 32. Therefore, the caulking groove 32 can be properly covered with the seal ring 41 or 51 with a simple structure.

In the rotary machine of the present embodiment, the predetermined gap G1 is provided between the end portion in the steam flow direction A1 of the seal ring 41 or 51 and the stator blade 13. Therefore, even when the casing, the stator blade 13, or the seal ring 41 or 51 expands thermally, the predetermined gap G1 suppresses the seal ring 41 or 51 from interfering with other members; thereby, deformation of the seal ring 41 or 51 can be suppressed.

In the rotary machine of the present embodiment, the flat surface 43 or 53 along the axial direction A of the rotor 12 is provided by the seal ring 41 or 51. Therefore, the leakage steam S1 leaking from the seal device 15 or 50 smoothly flows due to the flat surface 43 or 53; thereby, the leakage steam S1 can smoothly merge with the main flow of the steam S.

In the rotary machine of the present embodiment, the flat surface 43 of the seal ring 41 is continuous with the inner peripheral surface 11a of the casing 11 without a step therebetween. Therefore, the steam S entering the seal device 15 or the leakage steam S1 leaking from the seal device 15 smoothly flows due to the flat surface 43 and the inner peripheral surface 11a; thereby, the leakage steam S1 can smoothly merge with the main flow of the steam S.

Incidentally, in the above-described embodiment, the seal device is a labyrinth seal, but may be another non-contact seal.

In addition, in the above-described embodiment, the rotary machine of the present invention is applied to the steam turbine 10; however, the present invention is not limited to the steam turbine, and can be applied to a rotary machine, such as a compressor or an exhaust turbine, of which the internal pressure is higher than the external pressure during operation.

REFERENCE SIGNS LIST

10 Steam turbine (rotary machine)
11 Casing
11a inner peripheral surface
12 Rotor
13 stator blade
13a Blade root portion
13b Stator blade main body
13c Locking step portion
14 Rotor blade
14a Rotor blade main body
14b Shroud
14c Fin
14d Protrusion
14e Downstream end
15, 50 Seal device
20 Bearing
21 Rotor disk
22 Steam supply port
23 Steam passage
24 Blade row portion
25 Exhaust chamber
26 Steam discharge port
27 Seal member
31 Blade attachment groove (attachment recessed portion)
32 Caulking groove (caulking recessed portion)
32a First groove
32b second groove
32c Locking groove
33 Caulking member
33a Insertion portion
33b Locking portion
41, 51 Seal ring (seal member)
41a, 51a Attachment portion
41b, 51b Connection portion
41c, 51c Seal portion
41d, 51d Fin
41d-1 Upstreammost fin
41d-2 Downstreammost fin
41f Protrusion portion
42 Seal attachment groove
42a, 52a First groove
42b, 52b Second groove
42c Cutout portion
43, 44, 53, 54 Flat surface
A Axial direction
A1 Steam flow direction
R Radial direction
G1, G2 Predetermined gap
S Steam (fluid)
S1 Leakage steam
D1 First distance
D2 Second distance
D3 Third distance

The invention claimed is:

1. A rotary machine comprising:
a casing having a hollow shape;
a rotor that is rotatably supported in the casing;
a stator blade fixed to an inner peripheral portion of the casing;
a rotor blade that is shifted with respect to the stator blade in an axial direction of the rotor to be fixed to an outer peripheral portion of the rotor; and
a seal device disposed between the inner peripheral portion of the casing and a tip portion of the rotor blade,
wherein an attachment recessed portion is provided in the inner peripheral portion of the casing, and a caulking recessed portion is provided adjacent to the attachment recessed portion,
a base end portion of the stator blade is mounted in the attachment recessed portion, and a caulking member is locked to the caulking recessed portion and the base end portion of the stator blade, so that the stator blade is fixed to the inner peripheral portion of the casing, and
the seal device includes a seal member mounted in the inner peripheral portion of the casing, and the seal member covers at least a part of the caulking recessed portion.

2. The rotary machine according to claim 1,
wherein the caulking recessed portion is provided upstream of the attachment recessed portion in a flow direction of a fluid, and an end portion of the seal member, the end portion being located on a downstream side in the flow direction of the fluid, covers the caulking recessed portion.

3. The rotary machine according to claim 1,
wherein a predetermined gap is provided between an end portion of the seal member, the end portion being located in a flow direction of a fluid, and the stator blade.

4. The rotary machine according to claim 3,
wherein a flat surface along the axial direction of the rotor is provided by the seal member between a plurality of stages of the stator blades.

5. The rotary machine according to claim 4,
wherein the flat surface of the seal member is continuous with an inner peripheral surface of the casing without a step between the flat surface and the inner peripheral surface.

6. A seal member that is disposed between an inner peripheral portion of a casing and a tip portion of a rotor blade, the member comprising:
- an attachment portion mounted in the inner peripheral portion of the casing;
- a seal portion provided inside the attachment portion in a radial direction; and
- a plurality of fins that are provided at predetermined intervals in a flow direction of a fluid so as to protrude inward from the seal portion in the radial direction, wherein when a distance between an upstreammost fin and a downstreammost fin of the plurality of fins is D1, and a distance between the downstreammost fin and a downstream end of the seal portion is D2, D1 and D2 are set to satisfy D1×0.5<D2.

7. The seal member according to claim 6,
wherein when a distance between an upstream end of the seal portion and the upstreammost fin is D3, D3 is set to satisfy D3<D2.

8. The seal member according to claim 6,
wherein the seal portion includes a protrusion portion that extends further downstream than a downstream end of the rotor blade in an assembly state where the seal portion is assembled to the inner peripheral portion of the casing.

9. The seal member according to claim 8,
wherein a cavity is provided outside the protrusion portion in the radial direction in the assembly state.

10. The seal member according to claim 8,
wherein the plurality of fins are provided only upstream of the protrusion portion in the seal portion.

\* \* \* \* \*